United States Patent Office 3,535,369
Patented Oct. 20, 1970

3,535,369
DERIVATIVES OF FLUORINATED CARBOXYLIC ACIDS AND PROCESS FOR THEIR PREPARATION
Dario Sianesi and Adolfo Pasetti, Milan, and Franco Tarli, Rome Italy, assignors to Montecatini Edison S.p.A., Milan, Italy
No Drawing. Filed July 5, 1966, Ser. No. 562,527
Claims priority, application Italy, July 19, 1965, 16,199/65
Int. Cl. C07c *69/66, 69/76*
U.S. Cl. 260—473        1 Claim

ABSTRACT OF THE DISCLOSURE

Described are fluorinated compounds selected from the formula:

$$Q-\underset{\underset{Y}{|}}{\overset{\overset{X}{|}}{C}}-COZ$$

in which (a) Q is selected from the group consisting of fluorinated alkyl of the formulas $C_nF_{2n+1}$, $H(CF_2)_n$ and $Cl(CF_2)_n$ wherein $n$ is a whole number between 1 and 10, perfluorinated cycloalkyl containing 4 to 6 carbon atoms, perfluorinated aryl containing from 6 to 10 carbon atoms; (b) X and Y are each selected from the group consisting of F and OR, X always being different from Y; (c) Z is selected from the group consisting of F, OH, OMe, OR', $NH_2$, NHR' and NR'R'', wherein Me represents the equivalent of any element capable of forming hydroxides, $NH_4$, $NH_3R'$, $NH_2R'R''$ and NHR'R''R'''; and (d) R, R', R'' and R''' may be the same and are selected from substituted and unsubstituted alkyl containing 1 to 12 carbon atoms, wherein the substituents are selected from the group comprising F and Cl.

---

The present invention relates to new fluorine containing compounds and the preparation thereof. The preparation is based upon the use of an epoxide of a fluoroolefin as a reactant. More particularly, our invention relates to new classes of chemical substances obtainable by reaction of various organic or inorganic chemical reactants with the epoxides of perfluoroalphaolefins, particularly with the epoxide of perfluoropropylene,

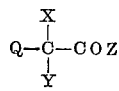

The epoxide of perfluoropropylene can be easily obtained. Among various methods of its preparation are: the electrochemical fluorination of

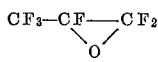

(British Pat. No. 672,720); the direct epoxidation of perfluoropropylene either with chemical oxidants (British Pat. No. 904,877); or the combined action of molecular oxygen and of ultraviolet radiation (Italian patent application No. 45,919, 1964).

Only a few reactions of this compound, have been known, such as, the oligomerization (Belgian Pat. No. 616,756), the reaction with fluorides of perfluorinated acids (U.S. Pat. No. 3,114,778), the reaction with thiocarbonyl compounds for the synthesis of fluorinated cyclic sulfides (U.S. Pat. No. 3,136,774).

These are reactions of a particular type and could justify the conclusion that the epoxide of perfluoropropylene, and by analogy, the epoxides of perfluoroolefins, have a moderate chemical activity. This activity is confined to a restricted and specific field. The epoxides of perfluoroolefins have no apparent analogy to the chemical behavior of the expoxides of olefins not containing vinylic fluorine atoms. The latter compounds are known to have a high interest and usefulness, since they react with various organic and inorganic reactants, allowing the synthesis of a great number of derivatives.

We have surprisingly found that, under suitable reaction conditions, a fluorinated epoxide can react with various common organic and inorganic reactants according to reactions, which proved to be of general application, leading to the formation of various products constituting new classes of organic substances. Broadly, the fluorinated compounds thus obtainable are derivatives of fluorinated carboxylic acids having at least one substituent different from fluorine on the carbon atom in α position.

The new fluorinated compounds, which are an object of the present invention, have the following formula:

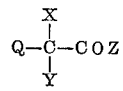

in which Q is selected from the group comprising the fluorinated alkyl radicals having the formula $C_nF_{2n+1}$, $H(CF_2)_n-$ and $Cl(CF_2)_n-$, wherein $n$ is a whole number between 1 and 10, the perfluorinated cycloalkyl radicals containing 4 to 6 carbon atoms, such as perfluorocyclobutyl and perfluorocyclohexyl, and perfluorinated aryl radicals such as perfluorophenyl, perfluorotolyl, containing 6 to 10 carbon atoms, X and Y are each selected from the group comprising F and OR, and X and Y are different from each other; Z is selected from the group comprising F, OH, OMe, OR', $NH_2$, NHR' and NR'R'', wherein Me is the equivalent of any element capable of forming hydroxides, $NH_4$, $NH_3R'$, $NH_2R'R''$ and NHR'R''R'''; R, R', R'', R''' are groups equal to or different from each other and are selected from linear or branched aliphatic radicals containing 1 to 12 carbon atoms (possibly containing substituents selected from the group comprising F and Cl), cycloalkyl, alkylaryl, aryl and halogen-substituted aryl radicals containing 6 to 10 carbon atoms.

The products are prepared, according to the invention, by reacting a fluorinated epoxide having the general formula

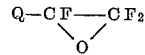

in which Q has the aforementioned meaning, with one or more reactants selected from the group comprising, primary, secondary or tertiary alcohols and phenols, ammonia, bases having the formula $Me(OH)_n$ in which Me is a metal having valence $n$, at temperatures between $-80°$ and $+250°$ C., preferably between $-40°$ C. and $+150°$ C., and under a pressure comprised between 0.1 and 100 atm., preferably between 1 and 50 atm.

The reaction of a fluorinated epoxide with one or more of the aforementioned reactants is carried out in the presence or in the absence of a solvent or dispersing agent. Useful solvents or dispersing agents are compounds, which are liquid under the reaction conditions, and which either do not react with the fluorinated epoxide or react with it with a negligible rate compared to reaction rate between the epoxide and the particular reactant. Suitable liquid diluents are ethers, ketones, esters, alcohols, aliphatic, cycloaliphatic, aromatic hydrocarbons and their halogen-derivatives such as $CH_2Cl_2$, $CHCl_3$, $CCl_4$, $CCl_2F_2$, $CHClF_2$, $CCl_3F$, $CF_2Cl$—$CF_2Cl$, $CF_2Cl$—$CFCl_2$, $CCl_3$—$CH_3$, $CCl_3$—$CF_3$, $CCl_2$=$CHCl$ benzotrifluoride, perfluorocyclobutane, perfluorodimethyl-cyclobutane and perfluoropropylene.

Frequently it is particularly advantageous to use one or more of the reactants in excess of the necessary stoichiometic amount as the liquid reaction medium.

The reaction can be carried out in any vessel resistant to the aggressive action of the reactants of reaction products and capable to withstand the pressure of the reacting system. The pressure can vary as the function of the particular reactants used, of the temperature and of the presence or absence of solvent liquid media. As it will be seen from the specific examples, the pressure can be within the range 0.1–100 atm. and is normally between 1 and 50 atm.

A particular object of this invention is the products obtained under the conditions above specified by using the epoxide of perfluoropropylene as the starting fluorinated epoxide. The new fluorinated compounds thus obtainable have a structure that can be expressed by the formula:

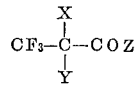

$$CF_3-\underset{Y}{\overset{X}{C}}-COZ$$

wherein X, Y, and Z have the aforementioned meaning. They can therefore be defined as derivatives of perfluoropropionic acid α-substituted or di-substituted with atoms or radicals different from fluorine.

Table I lists examples of new substances obtained by reaction of the epoxide of perfluoropropylene with some of the reactants employable within the scope of the present invention.

All these new compounds contain easily reactive chemical functions and are therefore suitable for a great number of further transformations, by well known technical reactions, such as saponifications, hydrolysis, esterification, salification, amidation, diazotation, N-alkylation, decarboxylation, dehydrohalogenation, transesterification, polymerization, etc. They, therefore, represent useful intermediates for the obtainment of a great number of derivatives and, either as such or as their derivatives. The compound can find various applications, as liquid solvents, which are stable to the action of temperature and as surface-active agents.

Some examples of practising the present invention follow hereinbelow. These examples are illustrative and not to be considered as limiting.

The chemical constitution of the new compounds described completely agrees with the centesimal analysis, the IR absorption spectra, the nuclear magnetic resonance spectra, the values determined for the molecular weights, the saponification numbers, the acidimetric equivalents, etc.

| Reactants | Substituents | | | | Product | |
|---|---|---|---|---|---|---|
| | X | Y | M | Z | Formula | Name |
| $CH_3OH$ | F | $OCH_3$ | — | $OCH_3$ | $CF_3$—$CF(OCH_3)$—$COOCH_3$ | Methyl-2-methoxy-tetrafluoropropionate. |
| $C_2H_5OH$ | F | $OC_2H_5$ | — | $OC_2H_5$ | $CF_3$—$CF(OC_2H_5)$—$COOC_2H_5$ | Ethyl-2-ethoxy-tetrafluoropropionate. |
| $C_2H_5OH$ + $NH_4OH$ | F | $OC_2H_5$ | — | $NH_2$ | $CF_3$—$CF(OC_2H_5)$—$CONH_2$ | 2-ethoxy-tetrafluoropropionamide. |
| $C_2H_5OH$ + $NaOH$ | F | $OC_2H_5$ | — | $ONa$ | $CF_3$—$CF(OC_2H_5)$—$COONa$ | Na-2-ethoxy-tetrafluoropropionate. |
| iso-$C_3H_7OH$ | F | $OC_3H_7$,iso | — | $OC_3H_7$,iso | $CF_3$—$CF(OC_3H_7iso)$—$COOC_3H_7iso$ | Isopropyl-2-iso-propoxy-tetrafluoropropionate. |
| sec-$C_4H_9OH$ | F | $OC_4H_9$,sec | — | $OC_4H_9$,sec | $CF_3$—$CF(OC_4H_9sec)$—$COOC_4H_9sec$ | sec.butyl-2-sec.butoxy-tetrafluoropropionate. |
| $CHF_2$—$CF_2$—$CH_2OH$ | F | $OCH_2$—$CF_2$—$CF_2H$ | — | $OCH_2$—$CF_2$—$CF_2H$ | $CF_3$—$CF(OCH_2CF_2CF_2H)$—$COOCH_2CF_2CF_2H$ | 2,2,3,3-tetrafluoropropyl-2-(2,2,3,3-tetrafluoropropoxy)tetrafluoropropionate. |
| $CH_2$=$CH$—$CH_2OH$ | F | $OCH_2$—$CH$=$CH_2$ | — | $OCH_2CH$=$CH_2$ | $CF_3$—$CF(OCH_2CH$=$CH_2)$—$COOCH_2CH$=$CH_2$ | Allyl 2-allyloxy-tetrafluoropropionate. |
| $CH_2Cl$—$CH_2OH$ | F | $OCH_2$—$CH_2Cl$ | — | $OCH_2CH_2Cl$ | $CF_3$—$CF(OCH_2$—$CH_2Cl)$—$COOCH_2$—$CH_2Cl$ | 2-chloroethyl-2-(2-chloroethoxy)tetrafluoro-propionate. |
| c.$C_6H_{11}OH$ | F | $OC_6H_{11}$,c | — | $OC_6H_{11}$,c | $CF_3$—$CF(OC_6H_{11},c)$—$COOC_6H_{11},c$ | Cyclohexyl-2-cyclohexyloxy-tetrafluoropropionate. |
| $C_6H_5OH$ | F | $OC_6H_5$ | — | $OC_6H_5$ | $CF_3$—$CF(OC_6H_5)$—$COOC_6H_5$ | Phenyl-2-phenoxytetrafluoropropionate. |
| $C_6H_5$—$CH_2OH$ | F | $OCH_2$—$C_6H_5$ | — | $OCH_2$—$C_6H_5$ | $CF_3$—$CF(OCH_2$—$C_6H_5)$—$COOCH_2$—$C_6H_5$ | Benzyl-2-benzyloxytetrafluoropropionate. |

EXAMPLE 1

A gaseous current of about 20 l./h. of the epoxide of perfluoropropene is bubbled from a gasometer by a circulation pump into a flask containing 300 cc. of methanol kept at room temperature. The unreacted epoxide is recycled to the gasometer and is continuously circulated until 56.6 g. of epoxide are absorbed by methanol. At this point, the reaction is stopped; the alcoholic solution, contained in the flask, is diluted with water and 69 g. of a heavy organic phase, insoluble in water, are separated. This crude product is repeatedly washed with water and then subjected to fractional distillation. 63 g. of methyl-2-methoxy-tetrafluoropropionate, boiling at 40–41° C. under 21 mm. of Hg, are obtained. The product thus obtained shows, by saponification, an equivalent weight corresponding to 190.4 and the centesimal analysis: $C=31.74\%$; $H=3.19\%$; $F=40.05\%$.

5 g. of methyl-2-methoxy-tetrafluoropropionate are treated with 20 cc. of concentrated aqueous $NH_3$. After 2 hours, at room temperature, an abundant crystalline precipitate forms. This is filtered, dried (4.25 g. of crude product) and recrystallized twice from benzene. 2 g. of 2-methoxytetrafluoropropionamide are obtained having melting point of 108.8°–109.2° C. and the centesimal analysis: $C=27.30\%$; $H=2.80\%$; $F=43.1\%$; $N=8.0\%$.

Another sample of methyl-2-methoxy-tetrafluoropropionate (38.5 g.) is treated with 250 cc. of ethanol and 120 cc. of a 2 N aqueous KOH solution. The whole is placed for 2 hours on a boiling water bath, cooled, neutralized with 2 N $H_2SO_4$ and dried. The salts thus obtained are dissolved in 250 cc. of water, then acidified with 100 cc. of $H_2SO_4$ at 20%, and extracted with 300 cc. of ethyl ether. The ether phase is dried, ether is removed under vacuum and the residue is fractionally distilled. 20 g. of 2-methoxy-tetrafluoropropionic acid, boiling at 71.5°–72.5° C. under 13 mm. Hg, showing an acidimetric equivalent weight of 176.0 and giving the following analytical results are obtained: $C=27.80\%$; $H=2.05\%$; $F=42.5\%$.

This example shows that an ether-ester of the type $CF_3 \cdot CF(OR)COOR$, prepared according to the invention, can be transformed into the normal derivatives of the carboxylic group by reactions of conventional type.

EXAMPLE 2

The epoxide of perfluoropropene is bubbled into a flask containing 500 cc. of ethanol kept at room temperature, using the same method as described in the preceding example. The gas circulation is continued until 128 g. of epoxide are absorbed by ethanol. The reaction is then stopped, the alcoholic solution contained in the reactor is diluted with water and 127 g. of a liquid phase, not miscible with water, which is repeatedly washed and finally subjected to fractionated distillation are obtained. 112 g. of ethyl 2-ethoxy-tetrafluoropropionate boiling at 50.5–51° C. under 14 mm. Hg, showing by saponification an equivalent weight of 215.9 and the following centesimal analysis are obtained: $C=38.85\%$; $H=4.81\%$; $F=35.3\%$.

In another experiment of reaction between the epoxide (10 g.) and ethanol (10 g.), 8 g. of ethyl 2-ethoxy-tetrafluoropropionate were obtained using 150 cc. of anhydrous ethyl ether as the solvent, at the temperature of −10–0° C. for 4 hours.

Wholly comparable results were obtained by preparing ethyl 2-ethoxy-tetrafluoropropionate by reaction of the two reactants carried out at about 0° C. in solution of acetone, methyl-ethyl-ketone, methylene chloride, tetrahydrofurane, dimethylether of ethyleneglycol, $CF_2Cl—CFCl_2$ and perfluorodimethylcyclobutane.

A portion (6 g.) of ethyl 2-ethoxy-tetrafluoropropionate is added to 20 cc. of concentrated aqueous ammonia. After sitting for two days, the abundant white precipitate, which formed, is filtered and dried to yield 3.80 g. of crude product. This is recrystallized twice from carbon tetrachloride. 1.90 g. of 2-ethoxy-tetrafluoropropionamide, having a melting point of 81.8–82.4° C. and the following centesimal analysis, are obtained: $C=31.49\%$; $H=3.69\%$; $F=39.8\%$; $N=7.43\%$.

Another sample of ethyl 2-ethoxy-tetrafluoropropionate (52 g.) is treated with 400 cc. of ethanol and 150 cc. of a 2 N aqueous KOH solution. The whole is placed on a boiling water bath and after 1 hour is neutralized with 2 N $H_2SO_4$ and is dried. The salts obtained are treated with 400 cc. of $H_2O$ plus 400 cc. of 20% $H_2SO_4$. The solution is extracted with 500 cc. of ethylether, the ether solution is dried, the solvent is evaporated under vacuum and the residue is fractionated. 20 g. of 2-ethoxy-tetrafluoropropionic acid, boiling at 83–84° C. under 13 mm. Hg, and showing an acidimetric equivalent of 185.6 and the following centesimal analysis, are obtained: $C=31.98\%$; $H=3.3\%$; $F=38.6\%$.

EXAMPLE 3

7.8 g. of isopropyl alcohol and 11.6 g. of epoxide of perfluoropropene are introduced into a glass vial. The vial is sealed and kept at room temperature for 10 days. It is then opened, the contents are poured into water and the oily product thus separated is extracted with chloroform. The organic solution is dried on $Na_2SO_4$, the solvent is removed by evaporation under vacuum and the residue is distilled off. 6.4 g. of isopropyl-2-isopropoxytetrafluoropropionate are obtained, boiling at 73–74° C. under 26 mm. Hg and showing by saponification an equivalent weight of 249.7 and the following composition: $C=43.97\%$; $H=5.9\%$; $F=31.15\%$.

EXAMPLE 4

10 g. of secondary butyl alcohol and 11 g. of epoxide of perfluoropropene are reacted, operating as in the preceding example, to yield 5 g. of sec. butyl 2-sec. butyloxy-tetrafluoropropionate.

EXAMPLE 5

The epoxide of perfluoropropene is bubbled into a flask containing 150 cc. of ethanol and 60 cc. of 10 N aqueous NaOH, using the same method as described in Example 1. The gas circulation is continued until 10 g. of epoxide are absorbed. At this point, the solution is poured into 700 cc. of $H_2O$, neutralized with 2 N HCl and evaporated to obtain about 40 g. of dry salts. These salts are extracted with ethanol. The alcoholic solution is dried leaving a residue of 12.9 g. of sodium salt of 2-ethoxy-tetrafluoropropionic acid. The crude salt is treated with 25 cc. of 100% $H_3PO_4$ to yield by distillation 7.8 g. of 2-ethoxy-tetrafluoropropionic acid.

EXAMPLE 6

60 g. of 2-chloro-ethanol and 10 g. of epoxide of perfluoropropene are introduced into a glass vial. The vial is sealed and left for 5 days at room temperature. It is then opened and the contents poured into $H_2O$. An oily layer weighing 11.5 g. is separated. This crude product is washed with $H_2O$, dried on $Na_2SO_4$ and fractionated. 7 g. of 2 - chloroethyl - 2-(2-chloroethoxy)-tetrafluoropropionate, boiling at 119–120° C. under 15 mm. Hg and showing the following analysis: $C=29.6\%$; $H=2.9\%$; $F=25.6\%$; $Cl=24.8\%$, are obtained.

3 g. of this product were refluxed on a water bath for 2 hours with 50 cc. of ethanol and 50 cc. of normal aqueous NaOH. The solution is neutralized with $H_2SO_4$ and dried. The salts thus obtained are extracted with ethanol. Evaporating of the alcoholic solution, 1.5 g. of the sodium salt of 2-vinyl-oxy-tetrafluoropropionic acid are obtained.

EXAMPLE 7

50 g. of 2,2,3,3-tetrafluoropropanol and 30 g. of epoxide of perfluoropropene are introduced into a 100 cc. autoclave. The autoclave is closed and is gradually heated to 80° C. over 5 days. After cooling, the reaction mixture is poured into H₂O, the organic layer is separated and repeatedly washed with water. The crude product (18 g.) thus prepared is subjected to fractionation to yield 10 g. of 2,2,3,3 - tetrafluoropropyl - 2 - (2,2,3,3 - tetrafluoropropoxy)-tetrafluoropropionate, boiling at 83° C. under 15 mm. Hg, and showing the following centesimal analysis: C=27.5%; H=1.65%; F=58.3%.

EXAMPLE 8

20 cc. of allyl alcohol and 4.6 g. of epoxide of perfluoropropene are introduced into a glass vial. The vial is sealed and left at room temperature for 8 days. It is then opened and the contents poured into H₂O. An oily layer weighing 5 g. is separated. This crude product is repeatedly washed with H₂O, dried on Na₂SO₄ and distilled. 3 g. of allyl 2-allyloxy-tetrafluoropropionate boiling at 74° C. under 15 mm. Hg and showing the following analysis: C=44.6%; H=4.2%; F=31.25%, are obtained.

EXAMPLE 9

30 g. of phenol and 20 g. of epoxide of perfluoropropylene are introduced in a 100 cc. autoclave. The autoclave is closed and kept in agitation for 4 days while heated progressively up to 100° C. As the reaction proceeds, the pressure, which inside the autoclave rises to above 10 atm., gradually decrease to atmospheric pressure. At this point, the autoclave is cooled and opened. The reaction mixture is poured into water whereby an oily layer weighing 13.6 g. separates. This crude product is washed with water, dried on Na₂SO₄ and distilled to yield phenyl 2-phenoxy tetrafluoropropionate, boiling at 81° C. under 0.05 mm. Hg, showing by saponification an equivalent weight of 302.6 and giving the following centesimal analysis: C=57.35%; H=3.35%; F=23.9%. After prolonged standing, this substance transforms itself into a crystalline mass having a melting point of 39.5–40° C.

We claim:
1. A compound of the formula

$$CF_3-\underset{\underset{OR}{|}}{C}F-COOR'$$

in which R and R' are the same and are selected from the group consisting of $CH_3$, $C_2H_5$, iso-$C_3H_7$, sec.$C_4H_9$, $C_6H_5$, $C_6H_5-CH_2$, $CH_2-CH_2-Cl$, $CH_2=CH$, $CHF_2-CF_2-CH_2$ and $CH_2=CHCH_2$

References Cited

UNITED STATES PATENTS

| | | | |
|---|---|---|---|
| 3,321,517 | 5/1967 | Selman | 260—544 |
| 3,180,895 | 4/1965 | Harris et al. | |
| 3,039,995 | 6/1962 | England | 260—539 |
| 3,321,515 | 5/1967 | Moore et al. | 260—544 |

OTHER REFERENCES

Knunyants et al.: Doklady Chemistry, 169, 722 (1966).
Knunyants et al.: Chem. Abstr., 51, 11234g. (1957).
McBee et al.: J. Am. Chem. Soc., 75, 3152 (1953).

LORRAINE A. WEINBERGER, Primary Examiner

D. E. STENZEL, Assistant Examiner

U.S. Cl. X.R.

260—468; 484, 487, 514, 515, 535, 539, 558, 561